(12) United States Patent
Sickert et al.

(10) Patent No.: US 7,614,317 B2
(45) Date of Patent: Nov. 10, 2009

(54) RACK-AND-PINION GEAR MECHANISM

(75) Inventors: Dirk Sickert, Bruehl (DE); Frank Peter Engels, Solingen (DE); Frank Odenthal, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1363 days.

(21) Appl. No.: 10/324,841

(22) Filed: Dec. 20, 2002

(65) Prior Publication Data
US 2003/0115980 A1 Jun. 26, 2003

(30) Foreign Application Priority Data
Dec. 21, 2001 (DE) ................. 101 63 282

(51) Int. Cl.
*F16H 19/04* (2006.01)
(52) U.S. Cl. .............. 74/422; 74/409; 29/525.12; 411/360; 411/930
(58) Field of Classification Search .......... 74/388 PS, 74/409, 422, 498; 411/82, 258, 271, 277, 411/360, 937.2, 930; 29/509, 512, 513, 520, 29/522.1, 525.05, 525.11–525.15; 219/152
See application file for complete search history.

(56) References Cited
U.S. PATENT DOCUMENTS
3,210,842 A * 10/1965 Schwinghamer ........... 29/522.1

(Continued)

FOREIGN PATENT DOCUMENTS
DE 31 51 835 C2 7/1983

(Continued)

OTHER PUBLICATIONS

Hoechst Technische Kunststoffe B.3.7 Ultraschallschweiben und-fugen von Formteilen aus technischen Kunststoffen (Hoeshst Technical Plastics B3.7 Ultrasound welding and jointing of moulded parts from technical plastics, 6t ed. Jan. 1990, p. 20, Chapter 7.3, Closing).

(Continued)

*Primary Examiner*—William C Joyce
(74) *Attorney, Agent, or Firm*—Fredrick Owens; MacMillan, Sobanski & Todd, LLC

(57) ABSTRACT

The invention relates to a rack-and-pinion gear mechanism (1), for example for use in a steering mechanism of a motor vehicle, and to a method for the production of the rack-and-pinion gear mechanism (1). The mechanism comprises a housing (101), in which a pinion shaft (102) is mounted so as to be rotatable about an axis (103). The pinion shaft (102) is connected to a rack (110) which is mounted in the housing (101) in such a way as to be longitudinally displaceable. A counter-pressure device (102, 123) compensates for reaction forces between the pinion shaft (102) and the rack (110), having a thrust piece (102) and an adjusting/closing nut (25), between which a spring (123) is supported. The adjusting/closing nut (25) is composed of a material which has a softening/melting point such that the adjusting/closing nut (25) can be softened and/or melted locally while installed in the housing (101) without damaging the housing (101). Softened and/or melted and resolidified partial areas of the adjusting/closing nut (25) are in form-locking engagement with the housing (101).

21 Claims, 2 Drawing Sheets

U.S. PATENT DOCUMENTS

| | | | | |
|---|---|---|---|---|
| 3,746,068 A | * | 7/1973 | Deckert et al. | 411/258 |
| 3,777,589 A | * | 12/1973 | Adams | 74/498 |
| 3,844,181 A | | 10/1974 | Bayle | |
| 3,925,876 A | * | 12/1975 | Curtis | 29/509 |
| 4,105,058 A | * | 8/1978 | Bunn et al. | 411/113 |
| 4,602,521 A | | 7/1986 | Bishop et al. | |
| 5,058,448 A | * | 10/1991 | Kiyooka et al. | 74/422 |
| 5,237,735 A | * | 8/1993 | Grossmann et al. | 29/522.1 |
| 5,672,036 A | * | 9/1997 | Medal | 411/82 |
| 5,718,149 A | * | 2/1998 | Phillips | 74/422 |
| 6,067,713 A | | 5/2000 | Bugosh | |

FOREIGN PATENT DOCUMENTS

| | | |
|---|---|---|
| DE | 3627088 A1 | 2/1988 |
| DE | 41 22 528 C2 | 1/1993 |
| DE | 44 27 113 A1 | 2/1996 |
| GB | 2 174 474 A | 11/1986 |

OTHER PUBLICATIONS

G. Erhard, E. Strickle, Maschinenelemente aus thermoplastischen Kunststoffen (G. Erhard, E. Strickle, Machine elements of thermoplastics, vol. 1: Foundations and Connecting Elements, VDI-Verlag GmbH, Dusseldorf, 1974, pp. 96, 97, Chap. 5.21.2 Hot-Heading.).

* cited by examiner

RACK-AND-PINION GEAR MECHANISM

TECHNICAL FIELD OF THE INVENTION

The invention relates to a rack-and-pinion gear mechanism, for example for use in a steering mechanism of a motor vehicle, and to a method for the production of the rack-and-pinion gear mechanism.

BACKGROUND OF THE INVENTION

Known rack-and-pinion gears mechanisms 100 (FIG. 2) have a pinion shaft 102 rotatably mounted in a housing 101. The pinion shaft 102 is mounted so as to be rotatable about an axis 103. It is seated in a pinion-shaft hole 104 in the housing 101 and is mounted in the housing 101 in the region of its free end 105 by means of a first rolling-contact bearing 106, which is designed as a locating bearing.

At the other end, the pinion shaft is connected to a steering column (not shown) of a motor vehicle, for example. In the region of the other end, the pinion shaft 102 is mounted in the housing 101 by means of a second rolling-contact bearing 107, which is designed as a non-locating bearing. Between the first rolling-contact bearing 106 and the second rolling-contact bearing 107, the pinion shaft 102 has teeth 108, which mesh with corresponding teeth 109 on a rack 110. The rack 110 is mounted so as to be axially displaceable along its longitudinal axis in the housing 101. Owing to the meshing engagement of the rack 110 with the pinion shaft 102, the imposition of a torque on the pinion shaft 102 gives rise to reaction forces, which act radially relative to the axis 103 and act as bending forces on the rack 110. To compensate for these bending forces, which have a disadvantageous effect on the engagement between the teeth 108 and the corresponding teeth 109, the prior art proposes to impose a counterforce on the rack 110 in the region of the engagement zone, on the rear side 111 of the rack 110, that is, the opposite side from the teeth 109.

The required counter force is generally applied by means of a thrust piece 112. The thrust piece 112 is mounted in a cylindrical opening 113 in the housing 101 in such a way as to be displaceable in a direction perpendicular to the axis 103. The opening 113 is surrounded by a cylindrical wall 114, which is formed integrally on the housing 101. The opening 113 furthermore has a center axis 115, which intersects the longitudinal axis of the rack 110 and the axis 103.

The thrust piece 112 has an essentially cylindrical three-dimensional shape with a first end 116 facing the rack 110 and a second end 117 facing away from the rack 110. The first end 116 has a recess 118, which has an approximately semi-cylindrical cross-section and corresponds to the rear surface 111 of the rack 110. Formed in the thrust piece 112, at the base of the recess 118, is a groove 119, which corresponds to a corresponding web 120 on the rear surface 111 of the rack 110.

Arranged in the center at the second end 117 of the thrust piece 112 is a blind recess 121, with the result that the second end 117 has an end face 122 in the form of a circular ring. Seated in the recess 121 is a spring element, e.g. in the form of a spiral compression spring 123, which is supported by one end on the base of the recess 121. In the region of the end face 122, the opening 113 has an internal thread 124, which extends as far as the axial end of the wall 114. In the region of the axial end, the opening 113 is closed by means of an adjusting/closing nut 125.

On its outer surface, the adjusting/closing nut 125 has an external thread 126, which corresponds to the thread 124, allowing the adjusting/closing nut 125 to be screwed into the opening 113. The adjusting/closing nut 125 furthermore has an annular end face 127, which lies opposite the annular end face 122 of the thrust piece 112 in the assembled condition. In the center, the adjusting/closing nut 125 has a recess 128, which is closed off at the end by a central end wall 129. The compression spring 123 is seated by means of its second end in the recess 128 and is supported on the end wall 129.

A defined clearance S is formed between the annular end face 127 of the adjusting/closing nut 125 and the annular end face 122 of the thrust piece 112. The clearance S is generally 0.15 to 0.30 mm wide and should be set carefully when mounting the thrust piece 112 and the adjusting/closing nut 125.

Examples of known rack-and-pinion gear mechanisms are disclosed in patent documents DE 3151835 C2 and GB 2174474 A each of which describe a rack and pinion gear where the rack-and-pinion gear according to the GB specification is actually designed as a rack-and-pinion steering gear for a motor vehicle. Both rack-and-pinion gears have an adjustable adjusting/closing nut. Through this nut a clearance S is set between the thrust piece and this adjusting/closing nut. The clearance can be seen in both specifications.

With reference again to FIG. 2, the clearance S should be maintained largely unchanged as regards its width during the entire operating time of the rack-and-pinion gear mechanism 100.

To ensure this, it is necessary to secure the adjusting/closing nut 125 against rotation after setting the width of the clearance S, thus preventing any unwanted change in the clearance S during operation.

The adjusting/closing nut 125 is made from steel, for example. To secure the adjusting/closing nut 125 against rotation, the prior art discloses the use of chemical screw-securing means, e.g. screw-securing means that act adhesively and/or in a sealing manner. It is furthermore also customary to caulk the adjusting/closing nut 125 to secure it, one or more blows from a center punch (punch force F) being applied in the region of the front end of the thread 124 and 126. As a result, the wall 114 and the adjusting/closing nut 125 undergo in the region of the thread a local deformation of the material, which thus prevents unintentional loosening and/or rotation of the adjusting/closing nut 125 by form-locking engagement.

Patent document DE 4122528 C2 discloses a method for producing screw-securing means. The screw to be secured is made from two different materials; it has a screw head and a thermoplastics material which is injected on same with positive locking engagement. After assembling the screw the plastics is brought into a fluid state through the supply of heat so that the plastics can flow into the recesses of a housing and after solidification lie contacting the wall of the recess. With this screw-securing means the plastics becomes completely soft or fluid.

As shown in FIG. 2, another known way of securing the adjusting/closing nut 125 against rotation is to deform the wall 114 into an oval shape in plan view in the region of thread engagement by means of radially acting forces to prevent rotation of the adjusting/closing nut 125.

Production methods of this kind to secure the adjusting/closing nut 125 against rotation have the disadvantage that high mechanical forces are introduced into the adjusting nut 125 and the wall 114 and these can have the effect that the preset clearance S changes in an uncontrolled and unintended manner due to the introduction of the mechanical forces, with the result that in some cases the clearance may even be reduced to 0 mm and the thrust piece 112 rests on the adjusting/closing nut 125 in such away that they form a single block. Another disadvantage with the known production methods is that the deformation of the material may give rise to leaks, allowing lubricant to escape from the rack-and-pinion gear and/or damp and/or moisture to penetrate the gear from outside. Moreover, rack-and-pinion gears of this kind are very difficult to service because it is not possible to rule out the housing being destroyed when the adjusting/closing nut 125 is unscrewed.

It is an object of the invention to provide a rack-and-pinion gear which is simple to assemble and is furthermore reliably sealed against lubricant loss and/or damp or moisture penetration. Moreover, the rack-and-pinion gear should be simple and inexpensive to produce and capable of being repaired or adjusted in a simple and non-destructive manner. In addition, the intention is to specify a method for the production of such a rack-and-pinion gear.

BRIEF SUMMARY OF THE INVENTION

In accordance with this invention, these and other objects are achieved by a rack-and-pinion gear comprising a housing, a pinion shaft rotatably mounted in the housing, a rack mounted in the housing and operatively connected to the pinion shaft so as to be longitudinally displaceable, and a counter pressure device that compensates for reaction forces between the pinion shaft and the rack. The counter pressure device comprises a thrust piece, an adjusting/closing nut, and a spring therebetween. The adjusting/closing nut is composed of a material having a softening/melting temperature lower than the housing. Furthermore, the adjusting/closing nut includes a portion that is locally plasticized or melted and resolidified in form-locking engagement with the housing.

In one aspect of this invention, a method is provided for producing a rack-and-pinion gear that includes providing an adjusting/closing nut composed of a material having a softening or melting temperature lower than the housing. The adjusting/closing nut is secured in the housing, and a portion of the adjusting/closing nut is locally heated to melt or plasticize the material, whereupon the material flows into form positive contact within at least one recess in the housing. The portion is then resolidified within the recess to produce a form-locking engagement between the adjusting/closing nut and the housing.

The invention will now be explained in greater detail, and by way of example only, with reference to the accompanying drawings, in which:

BRIEF DESCRIPTION OF THE DRAWINGS

The invention will now be explained in greater detail, and by way of example only, with reference to the accompanying drawings, in which.

DETAILED DESCRIPTION OF THE INVENTION

Figure 1:
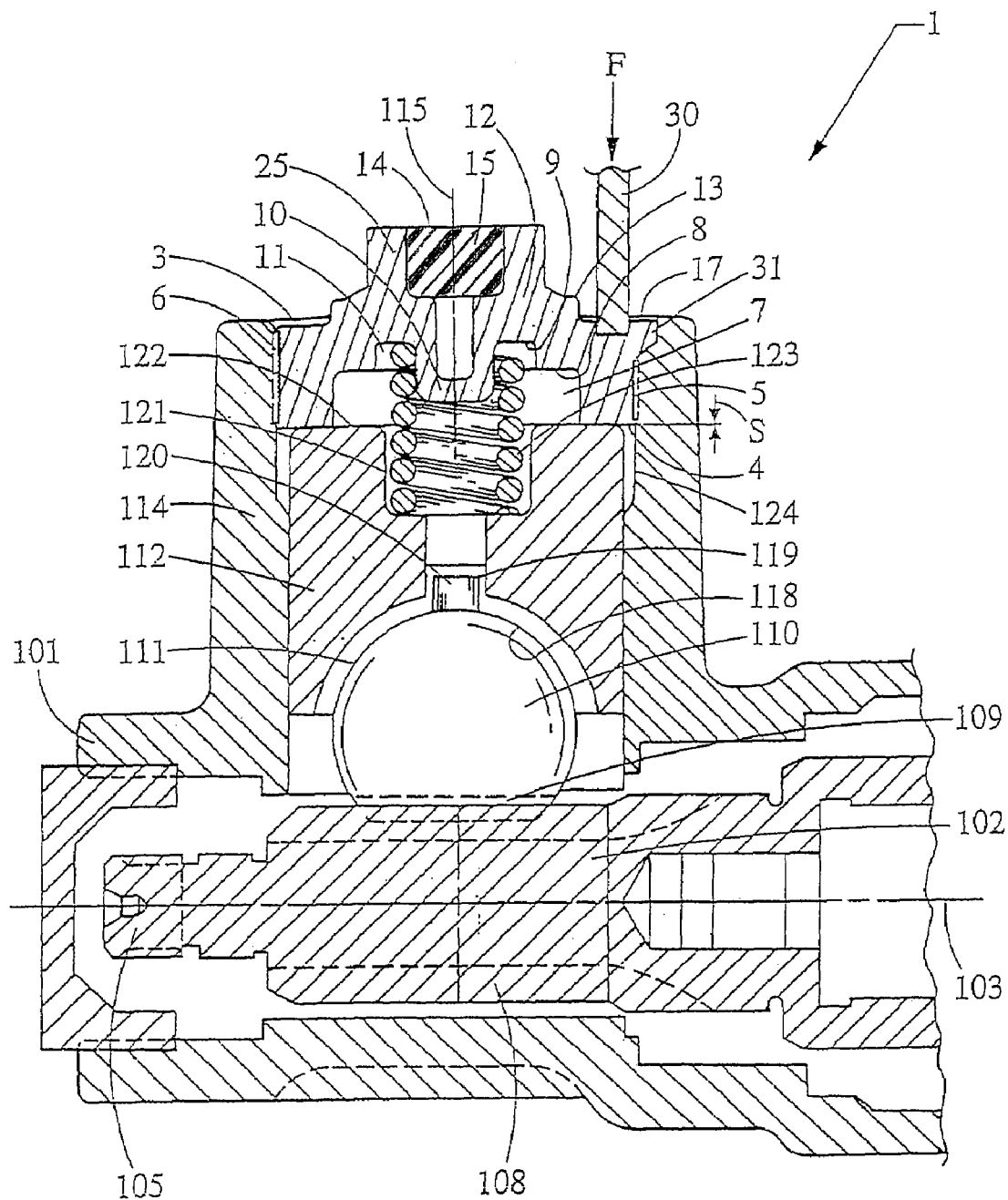
FIG. 1 shows a rack-and-pinion gear mechanism according to a preferred embodiment of the invention in a sectioned view through the region of engagement of the rack and the pinion.
Figure 2:
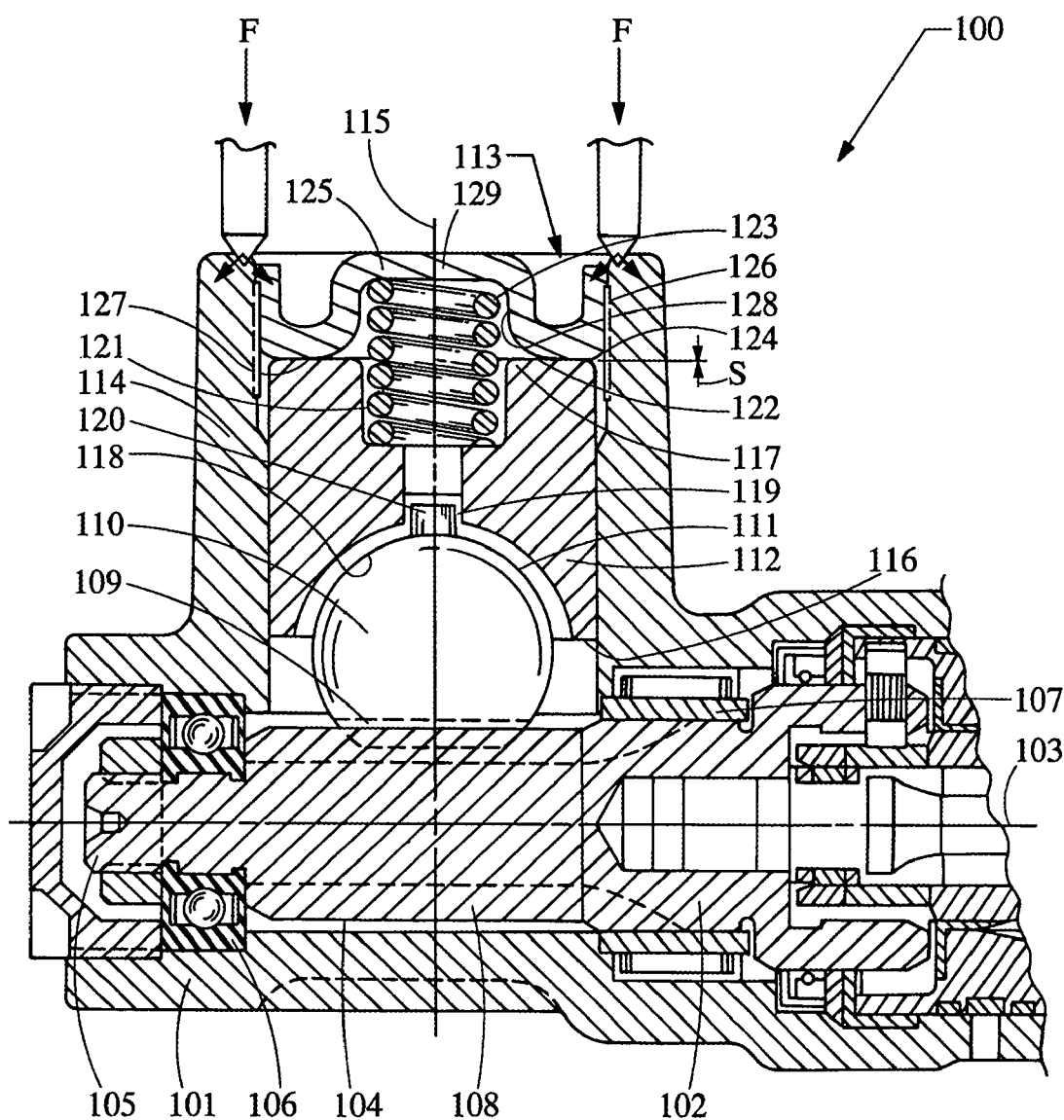
FIG. 2 shows a sectional representation of a known rack-and-pinion gear mechanism in a section plane through the region of engagement between the rack and the pinion.

As regards its basic structure, a rack-and-pinion gear mechanism 1 according to the invention (FIG. 1) has a pinion shaft 102, a rack 110 mounted in a housing 101 and also includes a thrust piece 112 in a cylinder wall 114 of housing 101 similar to the rack-and-pinion gear mechanism 100 in accordance with FIG. 1. The same reference numerals are therefore used in FIG. 2 for identical and corresponding parts.

According to the invention, the adjusting/closing nut 25 is made from a material which can be softened at relatively low temperatures, in particular which can be melted and, in particular, has a softening or melting point which is lower than the material of the housing 101. The chosen softening point or melting point of the selected material is high enough to ensure that the adjusting/closing nut 25 has sufficient strength under all operating conditions of the rack-and-pinion gear 1 according to the invention.

The essential point is that the material for the adjusting/closing nut 25 is chosen so that there is no possibility of damage, e.g. incipient softening or melting of the material of the housing 101, as a result of local softening or melting of the material of the nut in the edge region of the adjusting/closing nut 25.

The adjusting/closing nut 25 according to the invention has a three-dimensional shape which is essentially that of a circular disc with the center axis 115, a first end face 3, which faces the outer side of the housing 101 in the assembled condition, a second end face 4, which faces the annular end face 122 of the thrust piece 112 in the assembled condition, and a circumferential outer surface 5.

Over its entire axial extent, the circumferential surface 5 has a thread 6, which corresponds to the thread 124 in housing 101.

In the center of the second end face 4, the adjusting/closing nut 25 has a stepped recess 7, the diameter of which is greater than the spiral compression spring 123 and which has a step face 8 and a bottom stop surface 9.

Extending centrally from the bottom stop surface 9 is a dome-type projection 10, the outside diameter of which corresponds approximately to the inside diameter of the spiral compression spring 123. The projection 10 and the bottom surface 9 thus form an annular channel 11, in which the spiral compression spring 123 is seated.

Extending centrally from the first end face 3 is a projection 12 in the form of a stepped ring, an annular step 13 being formed in parallel at a distance from the first end face 3. From the annular step 13, the ring-type projection 12 extends with a reduced diameter somewhat further from the first end face 3, thus forming a ring end surface 14. The ring end surface may be an annular surface, or have an inner or an outer hexagonal profile for a hexagonal wrench, or have any other convenient profile.

Extending centrally around the axis 115 from the annular end surface 14 is a stepped blind recess 15, which extends into the region of the dome-type projection 10, narrowing in a single step, giving the projection 10 a three-dimensional form of U-shaped cross-section.

The stepped blind recess 15 is designed as a hexagonal recess, for example, allowing the adjusting/closing nut 25 to be screwed into the opening 113 with a socket-screw wrench (not shown), for example. The ring-type projection 12 can, of course, also have wrench application surfaces, e.g. for an open-ended wrench, on its circumferential surface.

According to a preferred embodiment of the invention, at least one radial recess 17, and preferably a plurality of radial recesses 17 distributed about the circumference, can furthermore be formed on the inner circumference of wall 114 about adjusting/closing nut 25, in the region of the screw-in thread 124, preferably in the region of the outer end of the cylindrical wall 114 adjacent threads 124.

In the fully assembled condition, there is temporarily melted or softened and resolidified material of the adjusting/ closing nut 25 in the radial recess 17, thus forming a rotational form-locking connection between the adjusting/closing nut 25 and the wall 114 of the housing 101.

Between the second end face 4 of the adjusting/closing nut 25 and the end 122 of the thrust piece 112 there is a clearance S, which is preferably 0.10 to 0.30 mm wide.

The cross section of the radial recess 17 can be of any shape. The essential point is that there is a rotational form-locking bond between the adjusting/closing nut 25 and the wall 114 once the radial recess 17 has been filled with material from the adjusting/closing nut 25.

The number and geometrical configuration of the recesses 17 depends on the requirements as regards the desired breakaway torque to release the adjusting/closing nut 25, and can be adapted to the required values in a simple manner.

Particularly where low breakaway torques are required, it may already be sufficient, for example, to bring some of the material of the adjusting/closing nut 25 into intimate contact with the material of the wall 114 by softening or melting, thus allowing a sufficiently high breakaway torque to be ensured merely by means of the surface roughness of, for example, the threads in conjunction with material from the nut flowing into the recesses of the latter.

There is therefore "micro form-locking engagement" between the adjusting/closing nut 25 and the wall 114.

The production method is explained in greater detail below:

After the essentially known assembly of the individual components of the rack-and-pinion gear, e.g. the installation of the pinion shaft 102 in the housing 101, the installation of the rack 110 in the housing 101 and the insertion of the thrust piece 112 into the opening 113 plus the arrangement of the spiral compression spring 123, the adjusting/closing nut 25 composed, for example, of plastic, is screwed into the internal thread 124 in an essentially known manner, the spiral compression spring 123 being compressed by a predetermined amount. The width of the clearance S between the adjusting/closing nut 25 and the thrust piece 112 is then adjusted in an essentially known manner.

In a subsequent step, a softening/melting device 30 is, according to the invention, made to interact with the adjusting/closing nut 25. The device 30 acts from the outside on the end face 3 of the adjusting/closing nut 25 in the region of existing recesses 17. Material of the adjusting/closing nut 25 is softened or melted locally in the region of the interaction zone. The action of mechanical pressure (force F), in particular pressure exerted with a free end of the softening/melting device 30, in the region of the softening/melting zone of the adjusting/closing nut 25, is used to make softened or melted material flow into the recesses 17.

Once material has flowed into the recesses 17, resolidification of the softened or melted material is ensured, resulting in a permanent change in the three-dimensional shape of the adjusting/closing nut 25. The material that has flowed into the recesses 17 and solidified there thus forms locking projections 31, which prevent turning of the adjusting/closing nut 25.

An ultrasonic welding device, or "sonotrode", has proven suitable as a softening or melting device 30, for example.

Other suitable softening/melting devices 30 are, for example, glow plugs or similar heating devices which allow local softening and/or melting of material of the adjusting/closing nut 25.

The rack-and-pinion gear mechanism 1 described above may be used in different applications, including, but not limited to, a motor vehicle steering mechanism. Particularly in automotive applications, it is advantageous that during maintenance of the steering mechanism, the removal of the adjusting/closing nut 25 is a simple matter, since the locking projections 31 can be sheared off in a simple manner and without damaging the housing 101 or the wall 114 by applying a breakaway torque to the adjusting/closing nut 25. Once the locking projections 31 have been sheared off, the adjusting/closing nut 125 can be unscrewed from the housing 101 in a simple manner. In the case of a rack-and-pinion gear mechanism according to the invention, the adjusting/closing nut 25 is composed of plastic or some other inexpensive material, allowing the nut to be used as a disposable part. The destruction of the adjusting/closing nut 25 when the rack-and-pinion gear is opened is of no significance as regards cost.

Another advantage of the invention is that securing the adjusting/closing nut 25 against rotation during the production of the rack-and-pinion gear mechanism requires only very little mechanical force to be introduced, with the result that the preset clearance S is not affected by the application of the deformation force F required to deform the adjusting/closing nut. This represents a significant improvement over known assembly methods since compliance with the nominal widths of the clearance S was not always possible in the past owing to the large amount of mechanical force introduced when carrying out punching or deformation.

The invention claimed is:

1. A rack-and-pinion gear mechanism comprising:
   a housing;
   a pinion shaft rotatably mounted in the housing;
   a rack mounted in the housing and operatively connected to the pinion shaft so as to be longitudinally displaceable; and
   a counter-pressure device to compensate for reaction forces between the pinion shaft and the rack, said counter-pressure device comprising a thrust piece, an adjusting/closing nut, and a spring therebetween, wherein the adjusting/closing nut is formed from a material having a softening/melting temperature lower than the housing and includes a portion that is locally plasticized or melted, and resolidified in form-locking engagement with the housing.

2. A rack-and-pinion gear mechanism in clam 1, wherein the adjusting/closing nut is composed of plastic.

3. A rack-and-pinion gear mechanism in claim 1, wherein the resolidified portion of the adjusting/closing nut engages at least one recess formed in the housing.

4. A rack-and-pinion gear in claim 1, wherein the adjusting/locking nut comprises a plurality of resolidified portions that engage recesses due to surface roughness of the housing and form a micro form-locking connection.

5. A rack-and-pinion gear mechanism in claim 1, wherein the adjusting/closing nut comprises a circular disc having a center axis, a first end face facing outwardly, a second end face facing the thrust piece, and a circumferential outer surface.

6. A rack-and-pinion gear mechanism in claim 5, wherein the spring is a helical spring, and the adjusting/closing nut includes a stepped recess in said second end face, such that an end of the helical spring is received in the stepped recess.

7. A rack-and-pinion gear mechanism in claim 6, wherein the second end face comprises a projection extending within the helical spring, and further comprises an annular channel in which the spring is seated.

8. A rack-and-pinion gear mechanism in claim 5, wherein the adjusting/closing nut comprises a projection extending from the first end face, said projection comprising an annular step formed in parallel at a distance from the first end face and extending with a reduced diameter away from the first end face to end in a ring surface.

9. A rack-and-pinion gear mechanism in claim 8, wherein the projection comprises a stepped blind recess extending centrally within the projection.

10. A rack-and-pinion gear mechanism in claim 9, wherein the stepped blind recess is a multi-sided recess, allowing the adjusting/closing nut to be screwed into a threaded opening in the housing by using a matching wrench.

11. A rack-and-pinion gear mechanism in claim 5, wherein the projection comprises outer circumferential wrench application surfaces, allowing the adjusting/closing nut to be screwed into a threaded opening in the housing by using a matching wrench.

12. A rack-and-pinion gear mechanism in claim 11, wherein the adjusting/closing nut is screwed into a threaded opening in the housing, there being at least one radial recess distributed over the inner circumference of the opening.

13. A rack-and-pinion gear mechanism in claim 1, wherein a clearance is provided between the adjusting/closing nut and the thrust piece.

14. A rack-and-pinion gear mechanism in claim 1, wherein the resolidified portion prevents dislodgement of the adjusting/closing nut.

15. A method for the production of a rack-and-pinion gear mechanism comprising a pinion shaft and a rack mounted in a housing and further comprising a counter-pressure device mounted in the housing; said counter-pressure device comprising an adjusting/locking nut, a thrust piece and a spring therebetween, said method comprising:
    providing an adjusting/closing nut formed from a material having a softening/melting temperature lower than the housing;
    securing the adjusting/closing nut in the housing;
    locally heating a portion of the adjusting/closing nut to melt or plasticize the material, whereupon the material flows into form positive contact within at least one recess in the housing; and
    resolidifying the material within said recess to produce a form-locking engagement between the adjusting/closing nut and the housing.

16. A method as claimed in claim 15, wherein the portion of the adjusting/locking nut is heated by ultrasound using a sonotrode, and is deformed with an end of the sonotrode into said form positive contact.

17. A method as claimed in claim 15, wherein after softening or melting, the material is deformed by exertion of a mechanical pressure.

18. A method as in claim 15, wherein the adjusting/locking nut is secured to adjust the spring to provide a clearance between the adjusting/locking nut and the thrust piece, and wherein the adjusting/locking nut is locally heated and resolidified without altering the clearance.

19. A method for the production of a rack-and-pinion gear mechanism comprising a pinion shaft and a rack mounted in a housing and further comprising a counter-pressure device mounted in the housing; said counter-pressure device comprising an adjusting/locking nut, a thrust piece and a spring therebetween, said method comprising:
    providing an adjusting/closing nut formed from a material having a softening/melting temperature lower than the housing;
    securing the adjusting/closing nut in the housing;
    locally heating a portion of the adjusting/closing nut to melt or plasticize the material, whereupon the material flows into form positive contact within at least one recess in the housing;
    exerting a mechanical pressure onto the material after the material has been melted or plasticized; and
    resolidifying the material within said recess to produce a form-locking engagement between the adjusting/closing nut and the housing.

20. A method as claimed in claim 19, wherein the portion of the adjusting/locking nut is heated by ultrasound using a sonotrode, and is deformed with an end of the sonotrode into said form positive contact.

21. A method as in claim 19, wherein the adjusting/locking nut is secured to adjust the spring to provide a clearance between the adjusting/locking nut and the thrust piece, and wherein the adjusting/locking nut is locally heated and resolidified without altering the clearance.

* * * * *